(12) United States Patent
Liu et al.

(10) Patent No.: US 7,457,075 B2
(45) Date of Patent: Nov. 25, 2008

(54) SYSTEM AND METHOD FOR REDUCING ZAP TIME AND TRACK SQUEEZE IN A DATA STORAGE DEVICE

(75) Inventors: Xiong Liu, Singapore (SG); Qiang Bi, Singapore (SG); TzeMing Jimmy Pang, Singapore (SG); ChoonKiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 96 days.

(21) Appl. No.: 10/785,628

(22) Filed: Feb. 24, 2004

(65) Prior Publication Data

US 2005/0185319 A1   Aug. 25, 2005

(51) Int. Cl.
G11B 5/596 (2006.01)
(52) U.S. Cl. .................................................. 360/77.04
(58) Field of Classification Search .................. 360/40, 360/77.04, 77.08
See application file for complete search history.

(56) References Cited

U.S. PATENT DOCUMENTS

| | | | |
|---|---|---|---|
| 5,280,395 A | 1/1994 | Matsuzaki | |
| 6,411,461 B1 | 6/2002 | Szita | |
| 6,437,936 B1 | 8/2002 | Chen et al. | |
| 6,449,116 B2 | 9/2002 | Morris et al. | |
| 6,473,254 B1 | 10/2002 | Hamaguchi et al. | |
| 6,476,995 B1 | 11/2002 | Liu et al. | |
| 6,563,663 B1 | 5/2003 | Bi et al. | |
| 6,608,477 B2 | 8/2003 | Sacks et al. | |
| 6,608,731 B2 | 8/2003 | Szita | |
| 6,747,835 B2 * | 6/2004 | AbouJaoude et al. | 360/77.04 |
| 6,898,047 B2 * | 5/2005 | Shishida et al. | 360/77.04 |
| 6,965,491 B1 * | 11/2005 | Perlmutter et al. | 360/77.04 |
| 7,271,977 B1 * | 9/2007 | Melrose et al. | 360/77.04 |
| 2001/0036033 A1 | 11/2001 | Baumann et al. | |
| 2001/0048570 A1 | 12/2001 | AbouJaoude et al. | |
| 2002/0027729 A1 * | 3/2002 | Siew et al. | 360/25 |
| 2002/0039248 A1 | 4/2002 | Liu et al. | |
| 2002/0067567 A1 * | 6/2002 | Szita | 360/77.04 |
| 2003/0030928 A1 | 2/2003 | Tang et al. | |
| 2003/0058570 A1 * | 3/2003 | Min et al. | 360/77.04 |
| 2003/0112544 A1 | 6/2003 | Harmer et al. | |

FOREIGN PATENT DOCUMENTS

| | | |
|---|---|---|
| EP | 0715299 | 1/1999 |
| EP | 0715299 B1 | 1/1999 |

* cited by examiner

Primary Examiner—Joseph H. Feild
Assistant Examiner—Daniell L Negrón
(74) Attorney, Agent, or Firm—Fellers, Snider, et al.

(57) ABSTRACT

A method and apparatus for compensating for errors in servo systems. An improved zero acceleration path (ZAP) correction technique is provided, wherein selected tracks of a data storage device are used for ZAP processing in order to reduce the overall time required to perform error compensation for a storage device. For a given selected track to be ZAPed, track profiles of adjoining tracks are used in addition to the track profile of the selected track as part of the ZAP correction determination for the selected track. Using adjacent track profiles as part of the ZAP correction determination assists in mitigating AC track squeeze issues that would otherwise occur when performing selective track ZAPing.

15 Claims, 4 Drawing Sheets

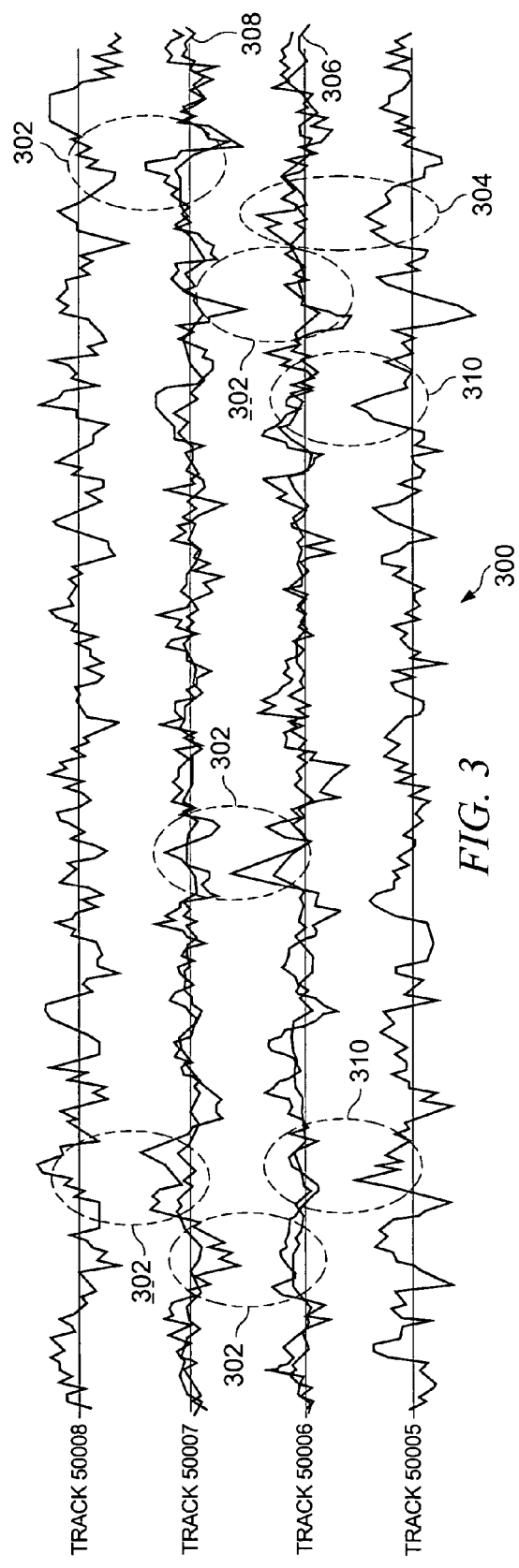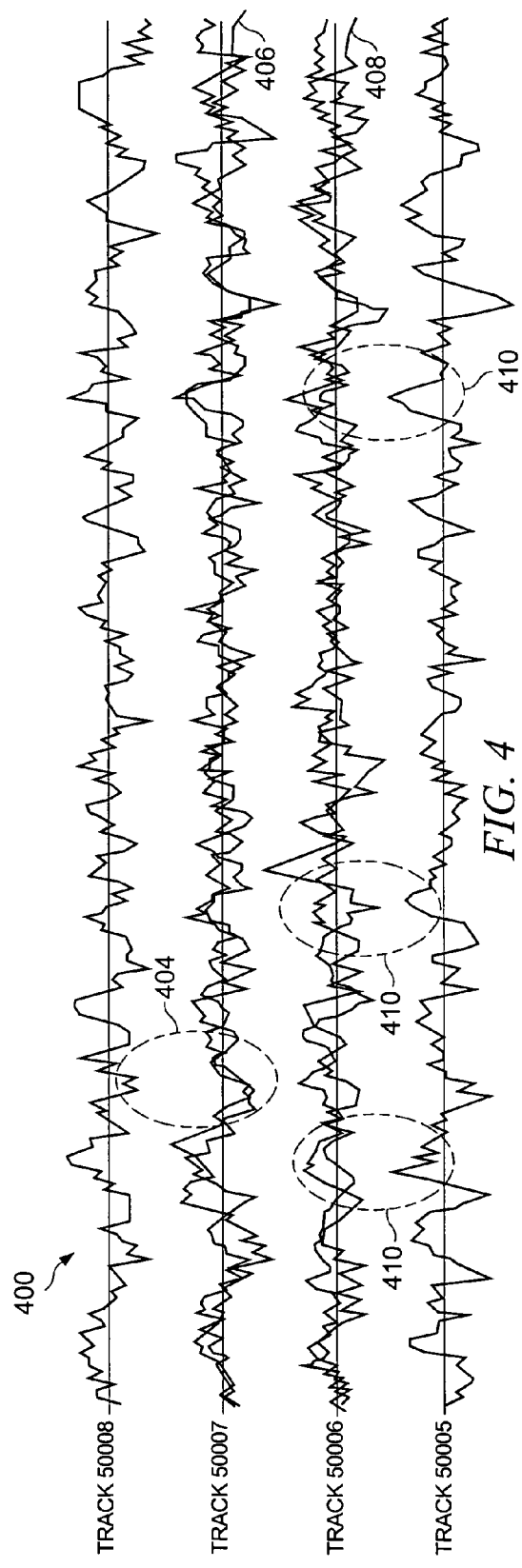

SYSTEM AND METHOD FOR REDUCING ZAP TIME AND TRACK SQUEEZE IN A DATA STORAGE DEVICE

FIELD OF THE INVENTION

The present invention relates generally to disc drive data storage systems. More particularly, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter read by the disc drive to determine position.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to, for example, unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable runout errors (RRO) because they cause the same errors each time the head moves along a track. As track densities increase, these repeatable runout errors begin to limit the track pitch. Specifically, variations between the ideal track path and the actual track path created by the servo fields can result in a track interfering with or squeezing an adjacent track. Track squeeze occurs when the distance of two adjacent tracks written by the servo track writer is smaller than the specified track spacing at certain points. Vibrations during the servo track writing process can cause track squeeze. Track squeeze has to be accounted for as an uncertainty when specifying the track spacing of a disc drive, and therefore, track squeeze limits the maximum achievable track density.

Track misregistration can also be caused by media imperfections. Slight differences of the magnetic properties of the media over the disc surface may cause variations in the magnitude of the servo bursts read by the head. This, in turn, results in a position measurement error and track misregistration.

Referring to diagram 100 in FIG. 1, solid line 102 represents an ideal servo track. Dashed line 104 represents the track center after the servo write process. Because of various disturbances occurring during the servo write process and media imperfections, the track center is not smooth. A disc drive actuator typically would have difficulty following this path.

During the operation of the disc drive, a position measurement signal is generated at each servo burst, and fed into a control system. The control system computes a correction factor or position error signal (PES), which is equivalent to the deviation of the measured actuator position from the desired position. During track following, the position error signal is a direct measure of the track misregistration and includes repeatable and non-repeatable components. The repeatable component, referred to as the repeatable position error signal, includes the repeatable runout written in by the servo track writer (SWRRO), and the disturbance caused by media imperfections. The control system makes use of the position error signal to reposition the head.

If the non-repeatable position error component is neglected, the perfectly circular track center can be followed with zero actuator acceleration. When zero actuator acceleration is achieved (a zero acceleration path or ZAP), track squeeze and track misregistration may be significantly reduced. A basic principle of ZAP correction method is to subtract an appropriate correction factor from the position measurement signal at each servo sample. If the correction factors are determined appropriately, the original zigzag path becomes smooth, i.e. the track center becomes a perfect circle.

Conventional ZAP methods are very effective in reducing the RRO and AC track squeeze in a hard disc drive. However, as densities of disc drives increase, the amount of time required to perform conventional ZAP methods similarly increases. The ZAP time includes RRO data collection time, ZAP compensation table computation time, head seek time and ZAP table writing (onto the disc) time. The ZAP time increases rapidly when the disc density, or tracks-per-inch (TPI), goes higher and higher. To avoid limitations on the track pitch, a system is needed to compensate for repeatable runout errors, while at the same time reducing the time required for such compensation. In addition, techniques are needed to mitigate track squeeze issues that may be introduced by such compensation time reduction. The present invention provides a solution to these and other problems, and offers other advantages over previous solutions.

SUMMARY OF THE INVENTION

The present invention relates to a method and apparatus for compensating for errors in servo systems. An improved zero acceleration path (ZAP) correction technique is provided, wherein selected tracks of a data storage device are used for ZAP processing in order to reduce the overall time required to perform error compensation for a storage device. For a given selected track to be ZAPed, where profiles used to position a head over the selected track are modified or ZAPed, track profiles of adjoining tracks are used in addition to the track profile of the selected track as part of the ZAP correction determination for the selected track. Using adjacent track profiles as part of the ZAP correction determination assists in mitigating AC track squeeze issues that would otherwise occur when performing selective track ZAPing.

These and various other features as well as advantages which characterize the present invention will be apparent upon reading of the following detailed description and review of the associated drawings.

BRIEF DESCRIPTION OF THE DRAWINGS

FIG. 3 is a diagram of position error signal (PES) repeatable run out (RRO) for a plurality of tracks of a data storage device, where ZAP-By-Exception (ZBE) compensation processing is performed.

FIG. 4 is a diagram of position error signal (PES) repeatable run out (RRO) for a plurality of tracks of a data storage device, where ZAP-By-Exception (ZBE) processing using adjoining track(s) profile information is performed.

DETAILED DESCRIPTION

The amount of time required by conventional ZAP methods used in reducing repeatable runout errors (RRO) in a data storage device is steadily increasing as data storage densities are increasing. One way of reducing the ZAP time is by using a technique herein described as ZAP-By-Exception (ZBE), which selectively ZAPs those tracks that have large PES and tend to cause track encroachment problems. In one ZBE embodiment, ZAP is applied to every track in the outside diameter (OD) zones since PES RRO is typically large at almost every track in such OD zone. In other zones, the ZAP is activated only on those tracks having a large PES or large mean of PES. In this later situation, ZAPing the track may bring down the PES RRO, and the 3-sigma of AC track squeeze value (AC SQ). However, at certain sectors, the ZBE processing could actually worsen the AC SQ. The following example will illustrate this point.

Figure 2:
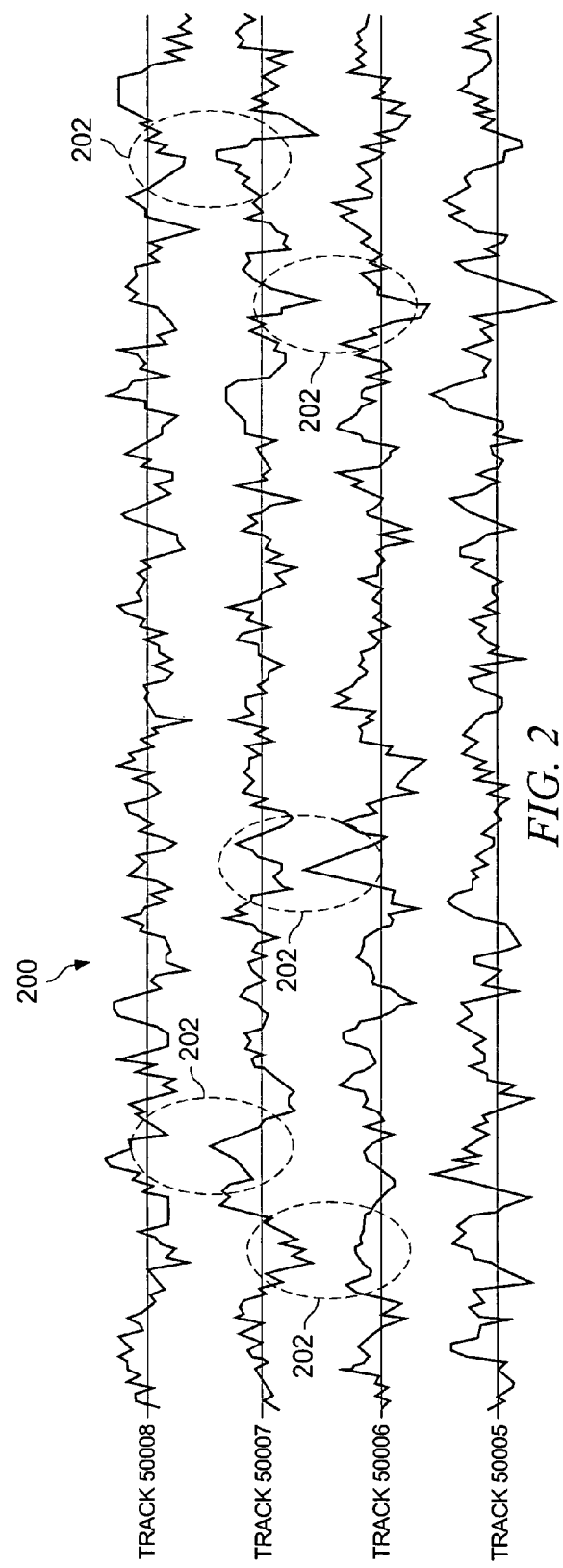
FIG. 2 is a diagram of position error signal (PES) repeatable run out (RRO) for a plurality of tracks of a data storage device, where no ZAP compensation processing is performed.

Referring now to FIG. 2, there is shown at 200 an example where ZAP compensation was disabled and the PES RRO for representative data tracks 50005, 50006, 50007 and 50008 were collected. Their respective 3-sigma PES RRO values are listed in Table 1 (shown below).

TABLE 1

| | PES RRO and AC SQ | | | | | |
|---|---|---|---|---|---|---|
| 3-sigma | | RRO | | | AC SQ | |
| (% TP) Track | w/o ZBE | w ZBE | w New ZBE | w/o ZBE | w ZBE | w New ZBE |
| 50005 | 8.32 | 8.22 | 8.22 | | | |
| 50006 ZBE | 7.97 | 3.02 | 6.17 | 11.04 | 8.57 | 5.39 |
| 50007 ZBE | 8.06 | 3.01 | 6.17 | 11.76 | 4.19 | ~=0.00 |
| 50008 | 7.97 | 8.16 | 8.16 | 11.13 | 8.96 | 5.63 |

The circles 202 in FIG. 2 illustrate the sectors where AC SQ could be a problem, and thus their associated tracks need to be ZAPed. Specifically, tracks 50006 and 50007 need to be ZAPed to correct these potential sector problems by reducing the PES RRO for such tracks. After applying the ZAP tables (obtained during the certification test of this representative drive) to tracks 50006 and 50007, the PES RRO for both tracks gets much better, as shown by the RRO w ZBE column in Table 1, and the PES RRO values shown by the dotted lines 306 (for track 50006) and 308 (for track 50007) in FIG. 3. Circles 302 in FIG. 3 correspond to the circles 202 in FIG. 2 where the potential problem areas were identified, and it can be seen that the PES RRO for tracks 50006 and 50007 in circled areas 302 have improved over that of FIG. 2. The ZAP used for the PES RRO shown at 300 in FIG. 3 is a conventional ZAP method, which computes the ZAP compensation table based on the PES RRO of current track only. It tries to build up a 'virtual' perfect track (a perfect circle) without considering the Written-In profiles of adjacent tracks. If the conventional ZAP is applied to every track, then theoretically, AC SQ will be improved. If ZAP is only applied to certain tracks (in the example, they are track 50006 and 50007) in this normal ZAP-by-Exception technique, it could actually cause AC SQ issues at certain sector locations between the ZAPed track and unZAPed track.

This is shown in FIG. 3, at the circle position 304, where AC SQ has worsened after ZAP. Here, track 50006 has been ZAPed, but track 50005 has not been ZAPed. As can be seen, the distance between the new PES RRO for track 50006 (in the circle position 304) and the PES RRO for track 5005 (in the circle position 304) is smaller than the original PES RRO for track 50006 (in the circle position 304) and the PES RRO for track 5005 (in the circle position 304), meaning the AC SQ has actually worsened here. In addition, at circle positions 310, the AC SQ has not improved, as the distance between the new PES RRO for track 50006 (in the circle positions 310) and the PES RRO for track 5005 (in the circle positions 310) is similar to the original PES RRO for track 50006 (in the circle positions 310) and the PES RRO for track 5005 (in the circle positions 310).

Figure 1:
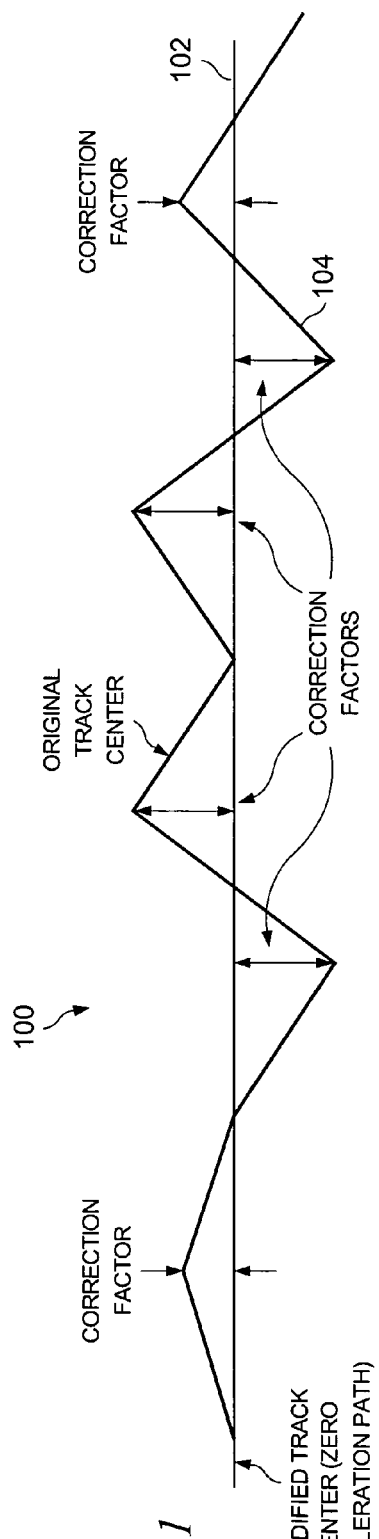
FIG. 1 is a diagram of a servo track written by a servo writer.

In an improved ZAP-By-Exception technique of the present invention, adjacent tracks information is considered and used to reduce AC SQ as well as PES RRO. Specifically, in the preferred embodiment, the ZAPed track profile includes the two adjacent tracks of the track being ZAPed in addition to the actual track being ZAPed. The targeted ZAPed track profile in ZBE is determined using the mean of the adjacent track profiles and the profile of the track being ZAPed. This may also reduce the AC SQ between ZAPed track and unZAPed tracks. An example is shown at 400 in FIG. 4, where the AC SQ values are greatly improved as shown by circled areas 404 and 410, and by Column AC SQ w New ZBE in Table 1. The reason for this improvement can be seen when considering circled area 304 of FIG. 3, where only a single track profile was used when ZAPing track 50006. The original PES RRO value for track 50006 deviated upward from the desired zero acceleration path value (see, for example, element 102 of FIG. 1), as did the original PES RRO value for adjacent track 50005. Because they both deviated upward, the resulting track spacing is greater than when track 50006 was ZAPed, since ZAPing track 50006 moved the resulting PES RRO value downward toward the otherwise ideal ZAP path and thus it is closer to the PES RRO for track 50005 (thereby resulting in an undesirable squeezing of the tracks). Therefore, in this example of using a single track profile when doing selective track ZAPing (ZBE), the AC SQ is worsened in some situations. By using adjacent track profiles in addition to the track profile of the track being ZAPed, the resulting PES RRO value tends to more closely track the ZAP pertebrations of the adjoining tracks and thereby maintain a greater distance between the adjoining track PES RRO values. In other words, instead of merely attempting to reduce the PES RRO to as small a value as possible, the PES RRO is reduced while also tracking/following to a certain extent the PES RRO of adjoining tracks in order to achieve better AC SQ. This can be seen in FIG. 4, at the right-most circled area 410, where the PES RRO value for track 50006 deviates upward in similar fashion to adjoining tracks 50007 and 50005, thereby maintaining good AC SQ between these tracks. If the adjoining track profiles were not used, the PES RRO at this location would be much closer to the ZAP baseline value, which would worsen the AC SQ between tracks 50006 and 50005 as their PES RRO values would be much closer together.

The detailed implementation for this preferred technique of ZBE using adjacent track information will now be described. Assume track n needs to be ZAPed. The Written-In track profiles for track n−1, n and n+1 by ZAP are determined using standard techniques. The Written-In track profiles for these three tracks are: WI(n−1), WI(n) and WI(n+1). The ZBE ZAP table for track n is:

$$ZAP(n) = -WI(n) - \text{alpha} * [WI(n-1) + WI(n+1)].$$

Alpha is a weighting value between 0 and 1. If Alpha=0, then it is a normal ZBE using profile information for a single track. For the new/improved ZBE, Alpha is typically set to 0.5 in the preferred embodiment. To ZAP a track n using this improved ZBE technique, 3 ZAPs (for track n−1, n and n+1) are needed to get the final ZBE compensation table for track n (therefore, the ratio of time of the new ZBE and that of the normal ZBE is 3:1).

If both track n and n+1 need to be ZAPed, the Written-In track profiles for track n−1, n, n+1, n+2 by ZAP are determined. The Written-In track profiles for these four tracks are: WI(n−1), WI(n), WI(n+1) and WI(n+2). The ZBE ZAP table for track n and n+1 is, respectively:

$$ZAP(n) = -WI(n) - \text{Alpha1} * WI(n-1) - \text{Beta1} * WI(n+2).$$

$$ZAP(n+1) = -WI(n+1) - \text{Alpha2} * WI(n-1) - \text{Beta2} * WI(n+2).$$

For a simple selection of weightings, Alpha1, Alpha1, Beta1, and Beta2 are all set to 0.5. In an alternate embodiment, they can be chosen based on the distance of the track being ZAPed to the boundary track (the boundary tracks in this example being n−1 and n+2; i.e. the tracks which bound the one or more adjacent tracks such as n and n+1 which are being ZAPed). For example, for ZAP(n), as track n is more close to track n−1 than it is to track n+2, weighting Alpha1 would be adjusted in this situation to be a little bit larger than 0.5. A total of four (4) ZAPs are needed for ZBE for two (2) continuous tracks (therefore, the ratio of time of the new ZBE and that of normal ZBE is 4:2).

With this new/improved ZBE technique, the time for ZBE is slightly increased over the normal ZBE time. For example, using a 4-head drive as an example, assume the time for full ZAP (ZAP for every track) is one (1). For the normal ZBE technique, Zones 0,1, 2 are fully ZAPed. In addition, 30%, 16%, 10% and 8% of the tracks are ZAPed in Zones 3, 4, 5, 6, respectively. In the remaining 9 Zones, around 3% of the tracks are ZAPed in each Zone (the size of a zone being dependent upon recording density, or tracks/inch and media form factor—in the present embodiment a typical zone is 2,000-4,000 tracks).

Normal ZBE time is: (1*3+0.30+0.16+0.10+0.08+9*0.03)/16=0.24 (or 24% of full ZAP time). That means that using the normal ZBE technique provided a time reduction of 76% over the time required for a conventional full ZAP.

For the new/improved ZBE method, in Zone 3~15, each ZBE needs 3-track-ZAP, and thus the total ZAP time for the new/improved ZBE method is: (1*3+3*(0.30+0.16+0.10+0.08+9*0.03))/16=0.35. That means that using the new/improved ZBE technique provided a time reduction of 65% over the time required for a conventional full ZAP.

In the above example, the percentage of how many tracks need to be ZAPed in each zone in each drive is different. It depends on the quality of the tracks written, which depend on mechanical disturbances of each drive. The above percentages were empirically determined using averages from many different drives to show as an example.

The following representative example shows when ZBE is triggered—i.e. when it is determined that a track needs to be ZAPed because its maximum or mean profile exceeds a predetermined threshold value. ZBE is invoked if:

PES(of a given track)>70% of Write Fault Threshold (WFT)(18 11.2% of Track Pitch)

OR

Mean of |PES|>3.28% of Track Pitch

Figure 5:
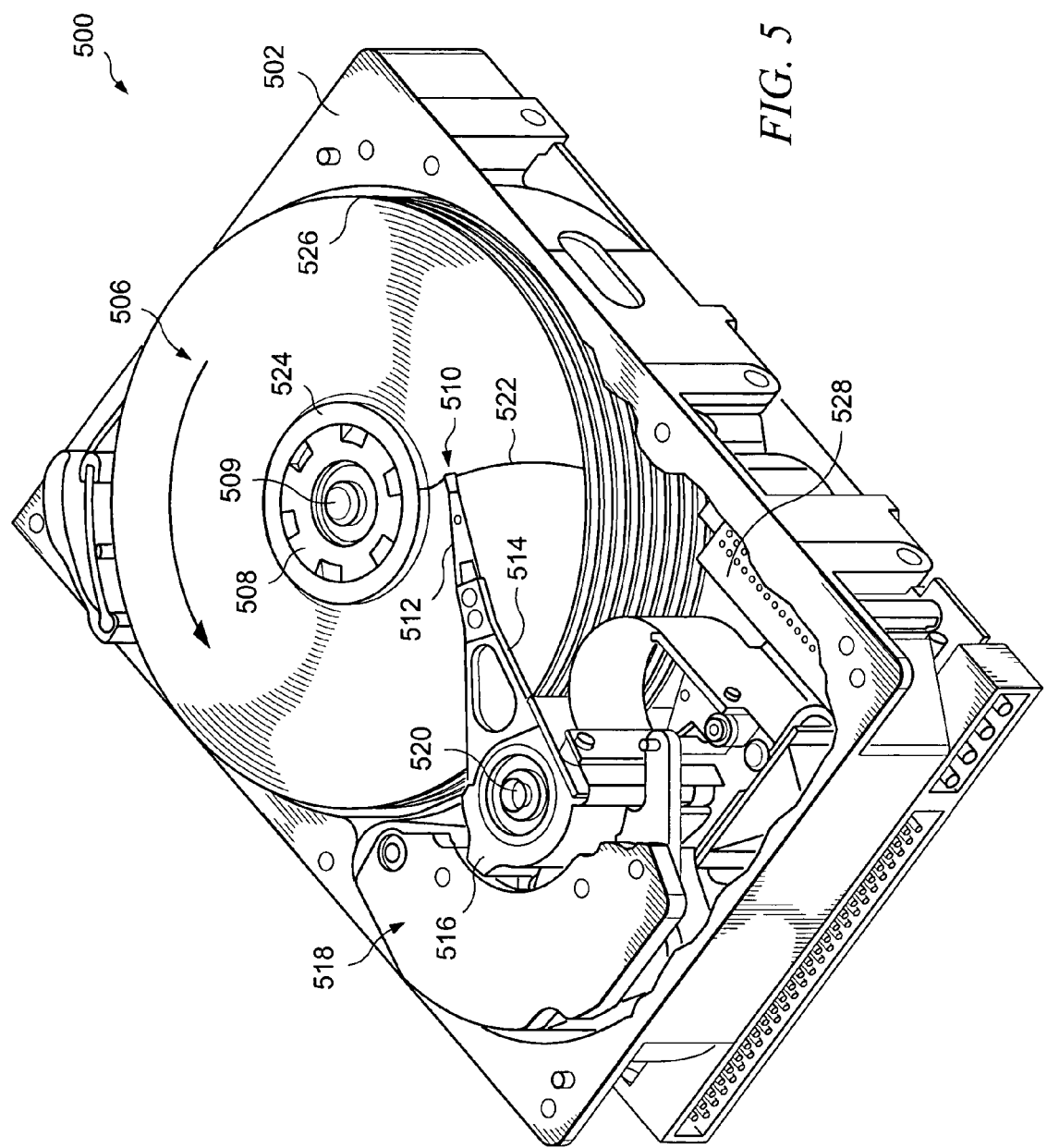
FIG. 5 is a perspective view of a head-disc assembly (HDA).

The general operation of typical data storage device that can advantageously use the improved ZBE method and system will now be described. Referring now to FIG. 5, a perspective view of a magnetic disc drive, head disc assembly (HDA) 500 in accordance with the present invention is shown. HDA 500 includes a housing with a base 502 and a top cover (not shown). HDA further includes a disc pack 506, which is mounted on a spindle motor (not shown) by a disc clamp 508. Disc pack 506 includes a plurality of individual discs which are mounted for co-rotation about central axis 509. Each disc surface has an associated slider 510 which is mounted in HDA 500 and carries a read/write head for communication with the disc surface. In the example shown in FIG. 5, sliders 510 are supported by suspensions 512 which are in turn supported by track accessing arms 514 of an actuator 516. The actuator shown in FIG. 5 is of the type known as a rotary moving coil actuator and includes a voice coil motor (VCM), shown generally at 518. Other types of actuators can be used, such as linear actuators. Voice coil motor 518 rotates actuator 516 with its attached sliders 510 about a pivot shaft 520 to position sliders 510 over a desired data track along a path 522 between a disc inner diameter 524 and a disc outer diameter 526. Voice coil motor 518 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 510 passes over the servo fields, the read/write head generates a readback signal that identifies the location of the head relative to the center line of the desired track. Based on this location, actuator 516 moves suspension 512 to adjust the head's position so that it moves toward the desired position. Once the transducing head is appropriately positioned, servo controller 528 then executes a desired read or write operation.

Figure 6:
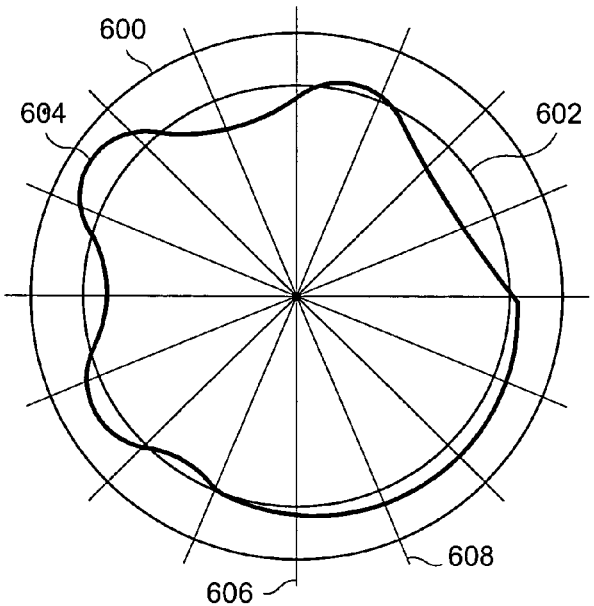
FIG. 6 is a top view of a section of a disc showing an ideal track and a realized written-in track.

Referring now to FIG. 6, a top view of a section 600 of a disc with an ideal, perfectly circular track 602 and an actual track 604 is shown. Section 600 includes a plurality of radially extending servo fields such as servo fields 606 and 608. The servo fields include servo information that identifies the location of actual track 604 along disc section 600. As previously described, any variation in the position of a head away from circular track 202 is considered a position error. The portions of track 604 that do not follow circular track 602 create written-in repeatable run-out position errors. Track 604 creates a repeatable run-out error because each time a head follows the servo fields that define track 604, it produces the same position error relative to ideal track 602.

Figure 7:
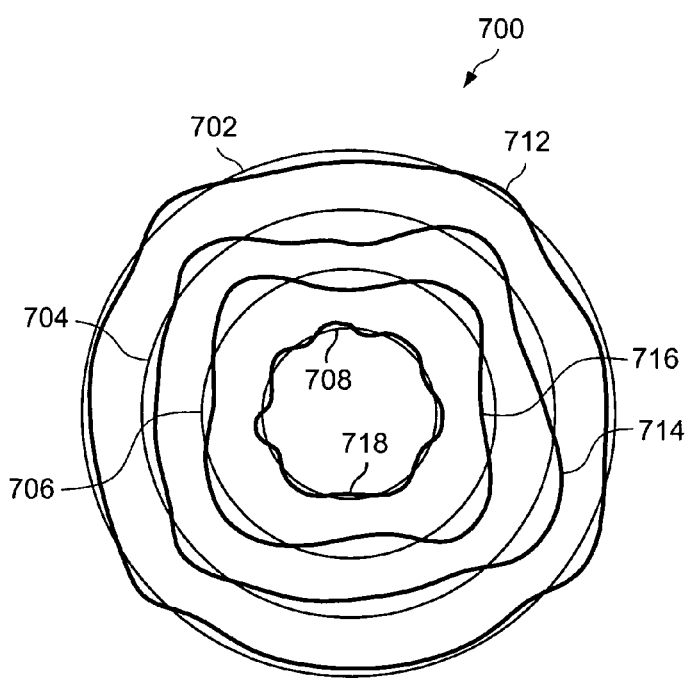
FIG. 7 depicts a sub-set of tracks on a disc, including their respective ideal track location and a realized written-in track.

Referring now to FIG. 7, a representative subset of tracks on a disc are shown at 700 (not to scale). The ideal track positions are shown at 702, 704, 706 and 708. The uncompensated tracks, with their associated position errors, are shown at 712, 714, 716 and 718. In this example, the position errors for tracks 714 and 716 are greater than a predetermined threshold value, and position errors for tracks 712 and 718 are less than the predetermined threshold value, so tracks 714 and 716 are selected to be ZAPed (i.e. ZAP-By-Exception). This illustrates the example previously given where two tracks need to be ZAPed, but their adjacent tracks do not. Track 712 corresponds to previously described track n−1, track 714 corresponds to previously described track n, track 716 corresponds to previously described track n+1, and track 718 corresponds to previously described track n+2. In this example, the adjacent tracks whose track profiles are used in addition to the track profile of the track to be ZAPed would be tracks 712 and 718, also known as the boundary tracks. The Written-In track profiles for these four tracks are determined to be WI(n−1), WI(n), WI(n+1) and WI(n+2), which correspond to actual track positions 712, 714, 716 and 718 shown in FIG. 7. The ZBE ZAP table for track 714 and 716 is, respectively:

$$ZAP(\text{track }714)=-WI(\text{track }714)-\text{Alpha1}*WI(\text{track }712)-\text{Beta1}*WI(\text{track }718).$$

$$ZAP(\text{track }716)=-WI(\text{track }716)-\text{Alpha2}*WI(\text{track }712)-\text{Beta2}*WI(\text{track }718).$$

Figure 8:
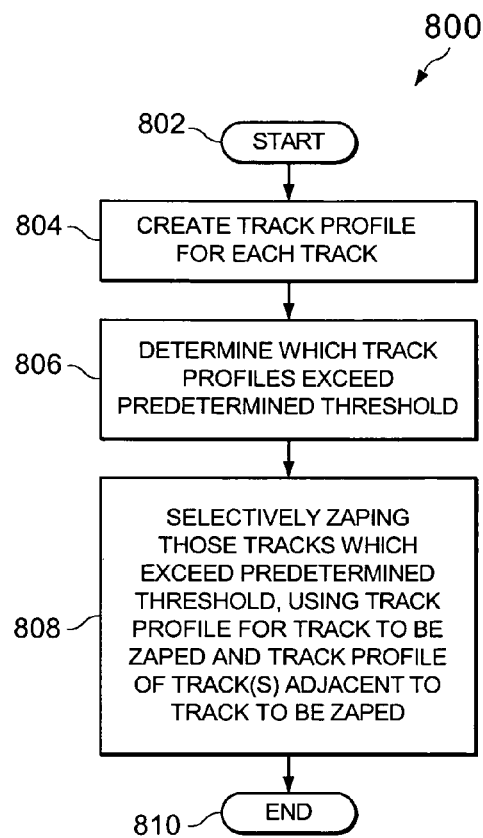
FIG. 8 is a flow diagram of an improved ZAP-By-Exception processing technique in accordance with the present invention.

Referring now to FIG. 8, a process flow is shown at 800 for the improved ZAP-By-Exception method herein described. The process begins at 802 and proceeds to 804 where a track profile for each track is created. At step 806, the track profiles are analyzed to determine which of them need to be further processed due to it exceeding some predetermined error condition or threshold value. The tracks requiring further processing are ZAPed at block 808 using an improved ZAP-By-Exception correction technique, where the track profile for the track identified as requiring further processing is used along with the track profile for the track(s) adjacent to such track as part of the ZAP correction. Once all tracks requiring further processing have been processed by block 808, the process ends at 810.

Thus, an improved zero acceleration path (ZAP) correction technique is has been described, wherein selected tracks of a data storage device are used for ZAP processing in order to reduce the overall time required to perform error compensation for a storage device. For a given selected track to be ZAPed, track profiles of adjoining tracks are used in addition to the track profile of the selected track as part of the ZAP correction determination for the selected track. Using adjacent track profiles as part of the ZAP correction determination assists in mitigating AC track squeeze issues that would otherwise occur when performing selective track ZAPing.

The description of the present invention has been presented for purposes of illustration and description, and is not intended to be exhaustive or limited to the invention in the form disclosed. Many modifications and variations will be apparent to those of ordinary skill in the art. For example, while the preferred embodiment is shown as electronic circuitry, it would also be possible to implement the inventive concepts in microcode or other form of software routine. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising determining a head positioning profile for a first track in relation to a track profile for the first track, a track profile for a second track, a track profile for a third track and a non-zero weighting value, the method further comprising a prior step of comparing the track profile for the first track to a predetermined threshold, and performing the determining step in relation to said comparison, wherein a track profile is represented by WI, the first track is represented by n, the second track is represented by n−1, and the third track is represented by n+1, the head positioning profile is represented by ZAP(n), and wherein $ZAP(n) = -WI(n) - \text{alpha}*[WI(n-1)+WI(n+1)]$, where alpha is a number between 0 and 1.

2. The method of claim 1, wherein each track profile is a PES RRO track profile.

3. The method of claim 1, wherein the non-zero weighting value is substantially equal to 0.5.

4. The method of claim 1, wherein the first and second tracks are disposed on a rotatable data storage medium.

5. A method of compensating for positioning errors in a data storage device, comprising a step of determining a head positioning profile for a first track in relation to a track profile for the first track in combination with a track profile for a second track and a non-zero weighting value, wherein the head positioning profile of the determining step is further determined in relation to ZAP information for a third track.

6. The method of claim 5, further comprising a step of selectively performing the determining step for particular tracks on the data storage device based upon whether a given track has a track profile that exceeds a predetermined threshold value.

7. The method of claim 5, wherein the head positioning profile is determined in relation to $ZAP(n)=-WI(n)-\text{alpha}*[WI(n-1)+WI(n+1)]$, wherein WI(n) is the track profile for the first track, WI(n−1) is the track profile for the second track, WI(n+1) is a track profile for a third track, and wherein alpha is the non-zero weighting value.

8. The method of claim 7 wherein alpha is substantially equal to 0.5.

9. The method of claim 5, further comprising a prior step of comparing the track profile for the first track to a predetermined threshold, and performing the determining step for the first track in relation to said comparison.

10. The method of claim 5, wherein the first and second tracks are disposed on a rotatable data storage medium.

11. A system for compensating for positioning errors in a data storage device having a plurality of tracks by zero acceleration processing (ZAP), comprising:
    means for selectively determining which of the plurality of tracks to ZAP; and
    means for ZAPing at least one of the selectively determined tracks using a track profile of the track being ZAPed in addition to a track profile of a track adjacent to the track being ZAPed to generate a head positioning profile for the at least one track.

12. The system of claim 11, wherein each track profile is a PES RRO track profile.

13. The system of claim 11, wherein the plurality of tracks are disposed on a rotatable data storage medium of said device.

14. A method comprising steps of comparing a first track profile for a first track to a predetermined threshold, and determining a head positioning profile for the first track in relation to the first track profile, a second track profile for a second track, and a third profile for a third track when the first track profile has a first value relative to the predetermined threshold, else not determining a head positioning profile for the first track when the first track profile has a second value relative to the predetermined threshold, wherein a track profile is represented by WI, the first track is represented by n, the second track is represented by n−1, and the third track is represented by n+1, the head positioning profile is represented by ZAP(n), and wherein ZAP(n)=−WI(n)−alpha*[WI(n−1)+WI(n+1)], where alpha is a value between 0 and 1.

15. The method of claim 14, further comprising repeating the comparing and determining steps for each of a plurality of tracks on a storage medium so that a first subset of the plurality of tracks have said head positioning profiles determined therefor and a second subset of the plurality of tracks do not have said head positioning profiles determined therefor.

* * * * *